(12) United States Patent
Connors

(10) Patent No.: US 6,924,432 B1
(45) Date of Patent: Aug. 2, 2005

(54) FIREWALL DAMPER FOR SLEEVES HAVING DATA TRANSMISSION LINES

(76) Inventor: Thomas V. Connors, 1212 McFadden Dr., East Northport, NY (US) 11731-2722

( * ) Notice: Subject to any disclaimer, the term of this patent is extended or adjusted under 35 U.S.C. 154(b) by 30 days.

(21) Appl. No.: 10/841,044

(22) Filed: May 7, 2004

(51) Int. Cl.[7] .................................................. H02G 3/14
(52) U.S. Cl. ...................... 174/65 R; 174/19; 174/52.2; 174/50.55; 174/68.1; 174/68.3; 174/70 C; 248/74.1; 248/76.1; 248/635; 248/562; 248/603
(58) Field of Search ....................................... 174/65 R

(56) References Cited

U.S. PATENT DOCUMENTS

| | | |
|---|---|---|
| 2,431,154 A * | 11/1947 | Wikstrom ................ 285/149.1 |
| 4,061,344 A | 12/1977 | Bradley et al. |
| 4,249,353 A | 2/1981 | Berry |
| 4,259,542 A | 3/1981 | Tehan et al. |
| 4,432,465 A | 2/1984 | Wuertz |
| 5,079,389 A | 1/1992 | Nelson |
| 5,215,281 A * | 6/1993 | Sherman ................ 248/74.1 |
| 5,408,740 A | 4/1995 | Dee |
| 5,594,202 A | 1/1997 | Tobias |

* cited by examiner

Primary Examiner—Anthony Dinkins
Assistant Examiner—Anton Harris
(74) Attorney, Agent, or Firm—The Martinez Group, PLLC; Mark Sgantzos, Agent

(57) ABSTRACT

A firewall damper fitting for data transmission lines having a damper body and a vertically sliding cover plate. The cover plate and the damper body having protruding lip portions which allow removable access to data lines while providing an effective damper which retards heat and fire through a sleeve without damaging the data transmission lines.

10 Claims, 5 Drawing Sheets

FIREWALL DAMPER FOR SLEEVES HAVING DATA TRANSMISSION LINES

FIELD OF THE INVENTION

The invention relates to the field of providing a low heat and flame transfer damper fitting to close an opening in a fire rated barrier having a sleeve or the like. The sleeve housing data transmission lines, such as telephone lines, fiber-optic lines, Cat 5, 5e or 6 data transmission lines or any other sensitive data transmission lines. The low voltage lines can be either conventional copper lines or fiber optic lines. The damper fitting having a vertically sliding cover plate which is attached to the front of the damper by a set screws so that the cover plate slides perpendicularly to the damper and sleeve wherein the damper fitting can provide access to the lines inside the sleeve, when the cover plate is raised. The lines encased in malleable putty which does not harden.

BACKGROUND OF THE INVENTION

Traditional means of maintaining the integrity of a firewall having a sleeve is comprised of placing a fire rated caulking compound in a sleeve, where such caulking hardens to maintain the integrity of the firewall. A commonly used product in the field of firewall barriers which has an acceptable UL listed fire rating is FIRE CEMENT™, which is made by the 3M corporation and is a synthetic polymer latex caulk which hardens to a cementius like consistency. The placement of such caulking in a sleeve does not allow access to the sleeve so that more wire or other connections through the firewall can be made at future dates, since the caulking hardens and is not readily removable. When more wires are needed through the sleeve, the caulking must be chipped away or drilled through, so as to access the sleeve since the caulking must be placed over the entire sleeve opening in order to insure that the sleeve is not a point of heat or flame transfer through the fire barrier. The chipping or drilling of the hardened caulking exposes the data transmission lines present in the sleeve to potential damage when more data transmission lines are needed through the sleeve, since the data transmission lines are encased in the caulking material. This is a particular point of caution since data transmission lines such as high-speed CAT 5, 5e and CAT 6 data transmission lines are highly sensitive to bending or crimping. CAT 5e and CAT 6 data lines are the most sensitive since they cannot be spliced when severed and great care must be taken to insure they are not damaged when trying to access the sleeve after the sleeve is initially sealed with the caulking since the rate at which data transferred through these lines is diminished or stopped if the lines are damaged. Also, CAT 5e and CAT 6 lines cannot be spliced. If CAT 5e and CAT 6 lines are damaged, the lines must be replaced in their entirety since they cannot be repaired. High-speed data transmission lines, when functioning properly ensure efficient data transfer, yet if damaged must be replaced. Replacement of such lines provides a high cost alternative to the simple act of adding more lines to a sleeve through a fire barrier. Therefore, there does not currently exist a means by which to access a sleeve having existing data transmission lines without risking damage to the lines present in the sleeve and providing an efficient removable fire barrier. Currently, it is not convenient or possible with traditional sealing methods to provide a means by which a sleeve can be accessed so as to insert more data transmission lines in the sleeve, and also provide a fire-rated sealing of the sleeve while preventing damage to existing low-voltage data transmission lines.

It is an object of the present invention to provide a fire-rated damper fitting, which easily accesses a sleeve which accommodates data transmission lines through the firewall.

It is a further object of the invention to provide a damper fitting which can be easily affixed to an existing sleeve so as to provide a device, which does not damage existing low-voltage data transmission lines in the sleeve.

It is further an object of the present invention to provide a damper fitting which is simple in construction and easy to install and remove.

It is a further object of the present invention to provide a device, which can be firmly affixed to a sleeve and incorporates a fire-rated putty to inhibit the passage of fire through the sleeve, yet can be easily removed without chipping or drilling.

It is a further object of the present invention to provide a damper fitting which does not compress, crimp or bend data transmission lines so as to inhibit data transfer.

SUMMARY OF THE INVENTION

The instant invention relates to a device for maintaining the integrity of a firewall having a sleeve. The features and advantages of the present invention are achieved by providing a damper fitting over a sleeve opening through a firewall which can be compression clamped, threaded or attached by body set screws onto an end of a sleeve, and which is capable of releaseably supporting sensitive low-voltage data transmission lines through the sleeve. The damper fitting being comprised of a ring-shaped damper body which can be releaseably clamped on the end of a sleeve by means of a damper having a two-piece design. The two-piece design of the damper body being comprised of an upper portion and a lower portion having a pair of clamping bolts which provide a means by which the body of the damper can be clamped over the end of the sleeve. The damper body also having internal threads on the inside portion of the fitting, which can be mated to external threads on the end of the sleeve so that the damper can threadingly engage the end of the sleeve if the sleeve is threaded. The damper fitting can also be comprised of a one-piece body where the body is slidingly engaged to the sleeve and fixedly attached to the sleeve by means of body set screws. The body set screws locking the damper fitting over the sleeve. The damper body lastly having a perpendicularly protruding planar lip portion on the lower portion of the damper body which does not encroach on the inside diameter of the fitting, thus making usable the entire sleeve and damper fitting opening for the insertion of data transmission lines. The damper fitting also being comprised of a sliding vertical cover plate, slidingly engageable with the damper body portion opposite the threaded end where the sliding vertical cover plate is further comprised of a perpendicularly protruding lip portion. The lip portions of the damper body and the cover plate being slideably engageable so that the data transmission lines rest upon the protruding lip of the damper body and the protruding lip of the vertical sliding cover plate presses against the lines and the protruding lip portion of the damper body so as to hold the data lines between the protruding lip portions. The cover plate sliding by means of a pair of set screws threadingly engaged and axially aligned to the damper body. The cover plate traveling along vertical slots on the face of the vertically sliding cover plate aligned with the set screws so as to be able to slide the cover plate lip portion away from the damper body lip portion.

In use, the data transmission lines rest upon the lip of the damper body portion and the lip of the sliding plate lightly presses down on the low-voltage data transmission lines to minimize the opening to the space between the conductors. A bead of fire rated putty such as SPECSEAL FIRESTOP PUTTY™ made by STI industries or any other similar putty which does not harden and is fire-rated is placed along the inside face of the lip portions so as to encase the data transmission lines in putty, prior to mating the lip portion of the cover plate to the lip portion of the damper body. The cover plate and subsequently the protruding lip portions being fixedly held together by tightening the set screws onto the damper body.

The use of the damper fitting of the instant invention to access the low-voltage data transmission lines in the sleeve efficiently provides a fire-rated closure of the sleeve while providing access to the sleeve for future use in that the set screws can be backed away since they are remotely located and do not come in contact with the putty on the lip portions. The sliding plate can be subsequently lifted to expose the inside of the sleeve, since the putty is malleable, so that repairs can be made or new low-voltage data transmission lines can be threaded through the sleeve. The configuration of the sliding plate, specifically, the attachment of the cover plate onto the damper body provides for a tight fit between the protruding lip portions of the damper fitting to prevent heat and fire transfer through the sleeve without over-compressing the lip portions and subsequently the low-voltage data transmission lines, thus not retarding or damaging data transfer through the transmission lines.

In another aspect of the instant invention, the inside face of the lip portions of the sliding cover plate and the damper body are fitted to accommodate pads so that the fire-rated putty does not come into contact with the inside face of the lip portions. The clamping pads provide for the lifting of the cover plate lip portion away from the damper body lip portion without minor prying of the lips due to the adhesive tendencies of the putty compound thus leaving the existing transmission lines encased in the putty and not subject to damage.

In a second embodiment of the instant invention, the inside face of the protruding lip portion of the damper body is provided with a trough which extends the length of the lip so that the putty is placed in the trough. The trough providing a defined area in which the putty can be placed to insure that the lines are encased in the putty material, thus providing an efficient heat and flame barrier.

In a third embodiment of the instant invention, the lips of the body portion and the sliding cover plate are provided with a curvature to match that of the sleeve and damper fitting. The curvature of the lip portions provide for a cradling of the lines and a means by which to measure the minimum amount of putty that can be used to insure that the firewall damper effectively prevents flame and heat transfer through the sleeve. Further, the curved lip portions are capable of accommodating pads so as to more readily separate the lip portions from the data lines encased in putty.

The foregoing and other features and advantages of the present invention will be apparent from the following detailed description of the invention.

DESCRIPTION OF THE PREFERRED EMBODIMENTS

Figure 1:
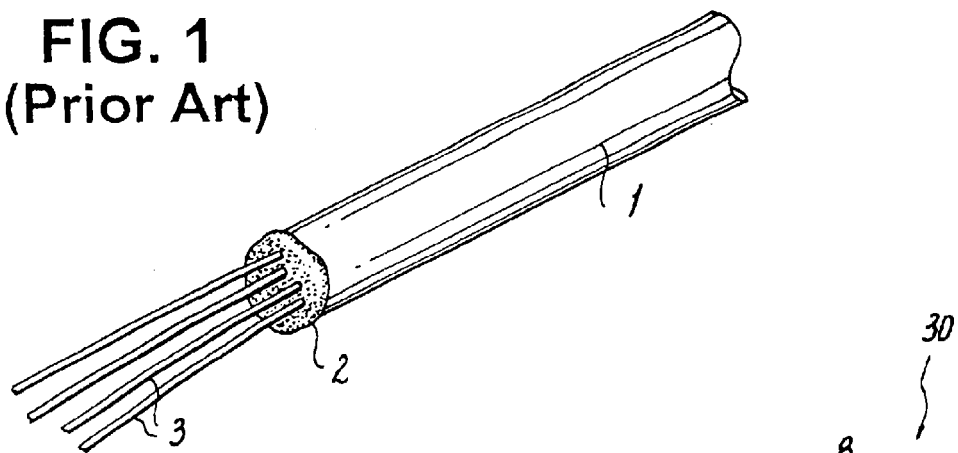
FIG. 1 is a prior art view of a traditional method in which sleeves having data transmission lines are sealed by covering the entire opening of the sleeve with a fire-rated caulking compound.

Referring to the drawings in detail, there are illustrated therein various exemplary embodiments of the damper fitting made in accordance with the teachings of the instant invention. These exemplary embodiments should not be construed as limiting.

FIG. 1 shows a typical prior art installation of data lines 3 through a sleeve 1 having a fire rated caulk 2 covering the entire opening of the sleeve 1 so as to encase the data lines 3 preventing the transmission of heat and flames through the sleeve 1 in the event of a fire. As stated previously, the fire-rated caulk 2 hardens after it is placed in the sleeve opening, thus providing a cement-like seal over the sleeve 1 opening, thus encasing the data lines 3 in the fire-rated caulk 2. In the event that the sleeve 1 needs to be opened so that new data transmission lines can be threaded in the sleeve, the caulk 2 must be chipped away or drilled through to expose the opening. Such chipping or drilling is likely to damage the data lines 3 already in use, thus such prior art methods of sealing the sleeve would likely damage the data transmission lines. Damaging the data lines in place would greatly increase the cost of threading new data lines since the old data lines would need to be replaced along with the time spent chipping away the caulk.

Figure 2:
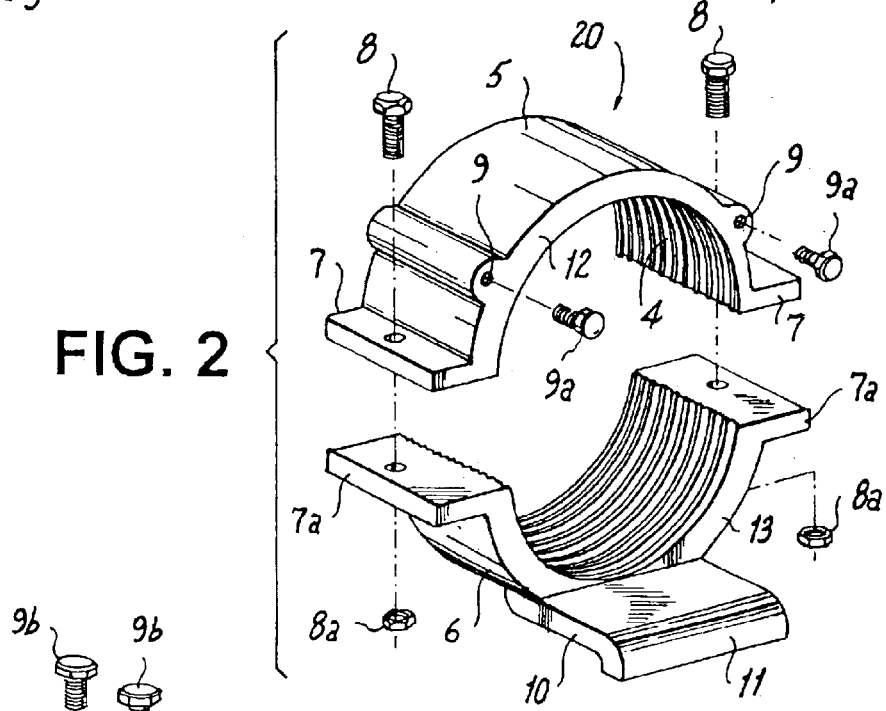
FIG. 2 is a perspective view of the damper body.
Figure 2A:
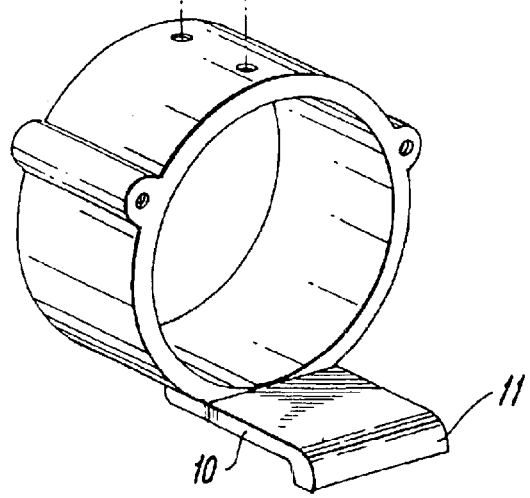
FIG. 2A is a perspective view of the damper body being of one-piece design.

FIGS. 2 and 2A illustrate the damper fitting 30 of the instant invention, and more specifically, the body of the damper generally denoted by reference numeral 20. The damper body 20 is comprised of a ring having an internal threaded section 4 to be mated to a threaded sleeve (not shown). The body 20 also being comprised of an upper body portion 5 and a lower body portion 6 where the upper and lower portions are mated by flanges 7 and 7a extending from the ends of the portions. The flanges 7 and 7a having through holes so that clamping bolts 8 and mating nuts 8a can be inserted therethrough in order to fixedly mate the body to a sleeve which is not threaded by means of an interference fit.

Therefore the damper fitting 30 of the instant invention can be mated to any configuration sleeve whether it is threaded or not. The upper portion 5 of the damper body having set screw threaded openings 9 on either side of the face of the damper body so as to accommodate set screws 9a to attach a vertically sliding cover plate 14 as substantially shown in FIG. 3. The set screw openings being fabricated so as to not extend through the damper body and in communication with the interior of the sleeve, since if the openings were to extend through to the sleeve interior, the heat and flame would have a means to traverse the barrier opening. The lower portion 6 of the damper body having a perpendicularly protruding lip portion 10 where the data lines (not shown) pass through the ring shape of the damper body 20 and rest on the lip portion 10. The lip portion extending from the bottom most section of the damper body opposite the threaded end. The lip portion having a downwardly curved edge portion 11 so that the data lines (not shown) do not engage a sharp corner thus potentially damaging the conductors as they are manipulated during installation. FIG. 2A shows the damper body as described above, with the exception that the damper body is comprised of a one-piece design. The damper body 20 as shown in FIG. 2A is comprised of a one-piece ring where the ring slidingly engages the sleeve end and is attached by body set screws 9b. The body set screws engaged the damper body through threaded openings (not labeled) and extend through the damper body whereby the body set screws press up against the sleeve so as to lock the body onto the sleeve.

Figure 3:
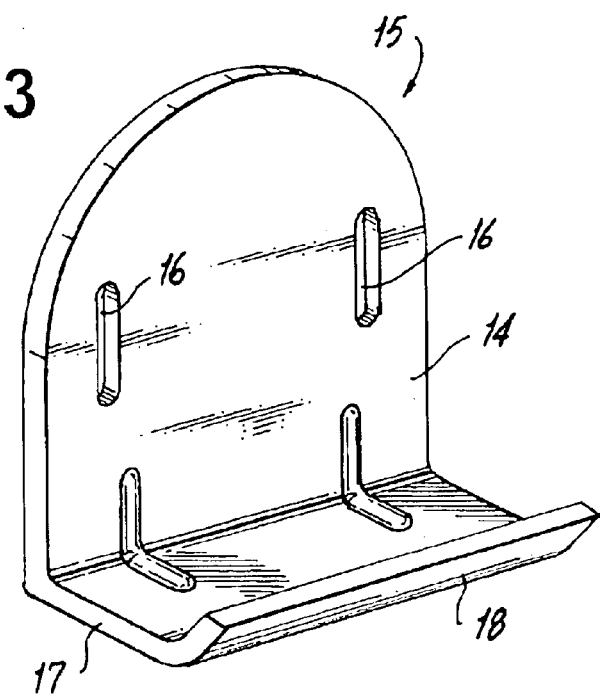
FIG. 3 is a perspective view of the vertically sliding cover plate having vertical slots.

FIG. 3 illustrates the vertically sliding cover plate 14 of the damper fitting 30. The cover plate 14 having an arc shaped cover portion 15 incorporating two vertically oriented slots 16 which align with the set screw openings 9 of the upper portion 5 of the damper body 20. The slots 16, when mated to the face (upper portion 12 and lower portion 13) of the damper body 20, do not extend or provide passage to the interior of the sleeve. As with the set screw openings 9 above, the interior of the sleeve must not have a communicable means with the exterior of the damper fitting in order to maintain an efficient fire barrier. The cover plate 14 also having a lip portion 17, which extends perpendicularly from the bottom of the cover portion 15 and slidingly engages with the lip portion 10 of the damper body. The lip portion 10 having an upwardly curved edge portion 18.

Figure 4:
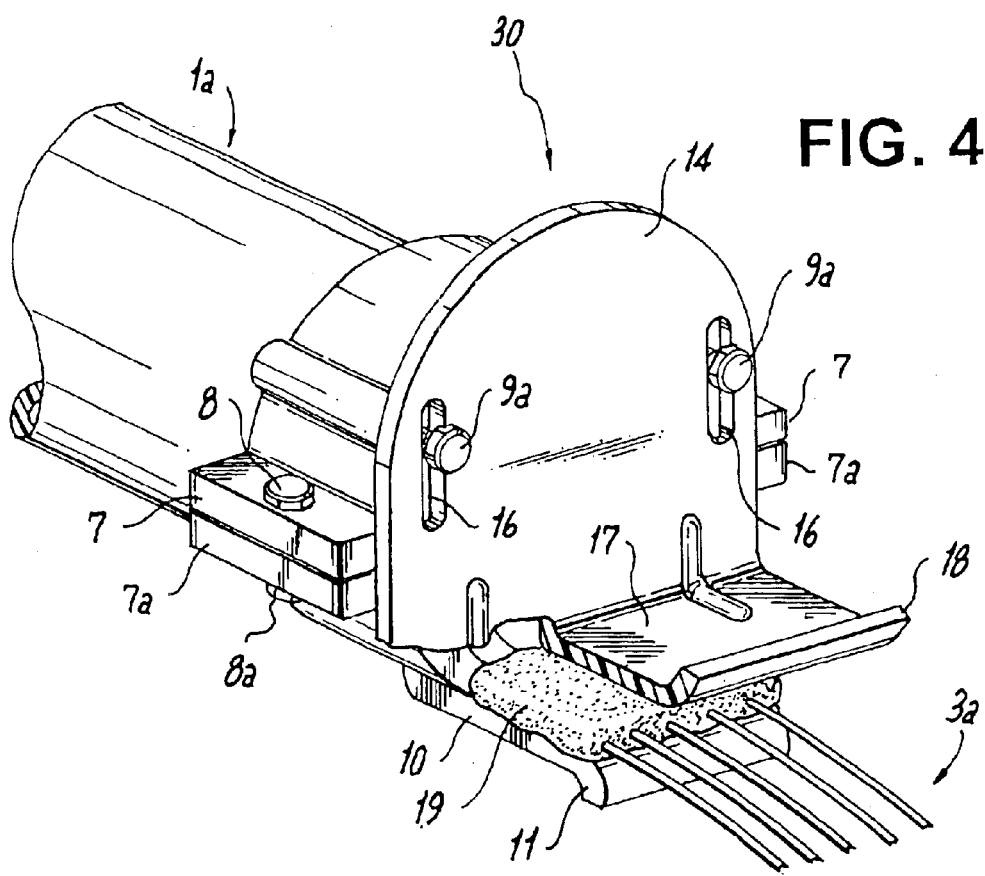
FIG. 4 is a perspective view of the damper fitting on a sleeve illustrating the mating of the sliding cover plate to the damper body.

FIG. 4 illustrates a preferred embodiment of the instant invention attached to a sleeve 1a. The sliding cover plate 14 is affixed to the damper body 20 by means of the set screws 9a and the slots allow for radial sliding movement of the cover plate lip portion 17 away from the body lip portion 10. As shown in FIG. 4, the damper fitting 30 is attached to the outer circumference of the sleeve 1a by either clamping the damper fitting onto the sleeve or by threadingly engaging the damper fitting onto mating threads of the sleeve. The data lines 3a are then passed through the damper fitting so as to rest upon the protruding body lip portion 10. A bead of fire rated-rated putty 19 is placed along the entire length of the body lip portion so as to minimally encase the data lines 3a. The vertically sliding cover plate 14 is then slidingly engaged so that the lip portion 17 of the cover plate 14 rests upon the data lines and the fire-rated putty 19. Lastly, the set screws 9a are tightened to secure the cover plate 14 to the damper body 20. The orientation of the set screws on the damper body and corresponding slots in the cover plate provide for a means by which the cover plate seals the sleeve opening, but also provides for a means to insure that the data lines are not damaged or inhibited from transmitting data due to their sensitivity to compression since the set screws 9a do not impart a downward clamping pressure between the cover plate lip portion 17 and the body lip portion 10. The compressive stress on the data lines is limited to the negligible weight of the cover plate 14 and the manual application of pressure from an installer to insure the putty 19 fills the voids between the data lines when the lips are positioned together. The damper fitting 30 provides for a means by which the sleeve 1a is effectively sealed and does not have to be destructively manipulated to access the sleeve in the event more lines or repairs to the existing data lines is necessitated.

Figure 5:
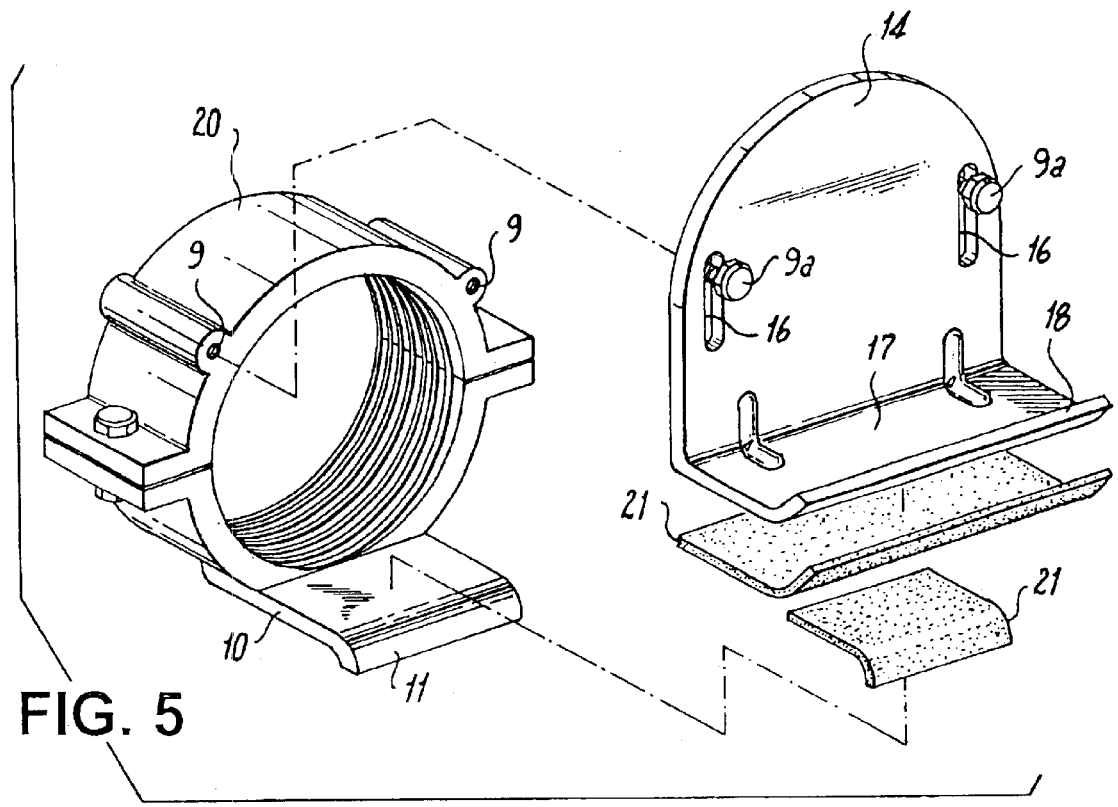
FIG. 5 is a perspective view of the damper fitting where the lip portions are fitted with pads to separate the data transmission lines having fire rated putty compound from physical contact with the lips.
Figure 6:
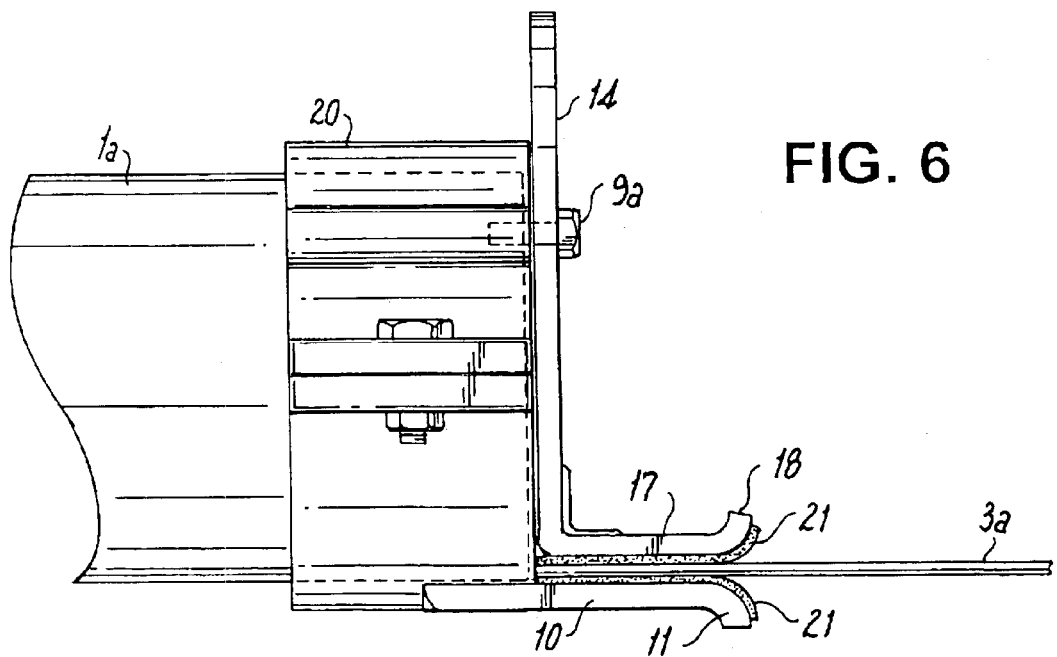
FIG. 6 is a side view of the damper fitting illustrating the spatial relationship between the data transmission lines and the lips having the pads.

FIGS. 5 and 6 show the damper fitting 30, fitted with damper pads 21 affixed to the lip portions 10 and 17 of the damper body 20 and the sliding cover plate 14. The damper pads 21 provide for easy removal of the lip portions from the data lines in that the lip portion 17 of the cover plate need not be pried open due to the putty affixing itself to both lip portions. The pads 21 can be adhesively secured or configured to have an interference fit with the lip portions so that they can be temporarily affixed to the lip portions prior to sliding the lips together. The pads can be of differing material to that of the damper or can be the same material as that of the damper as long as the pads have a sufficient UL listed fire rating. In use, a pad is placed on the lip 10 of the damper body 20 and the data lines are manipulated to rest on top of the pad 21. A bead of fire-rated putty 19 is placed along the pad. The pad which comes in contact with the lip of the sliding cover plate 14 is then affixed to the lip portion 17, and the cover plate 14 is slidingly engaged so that the lip portion 17 of the cover plate 14 sandwiches the data lines 3a between the pads 21.

Figure 7:
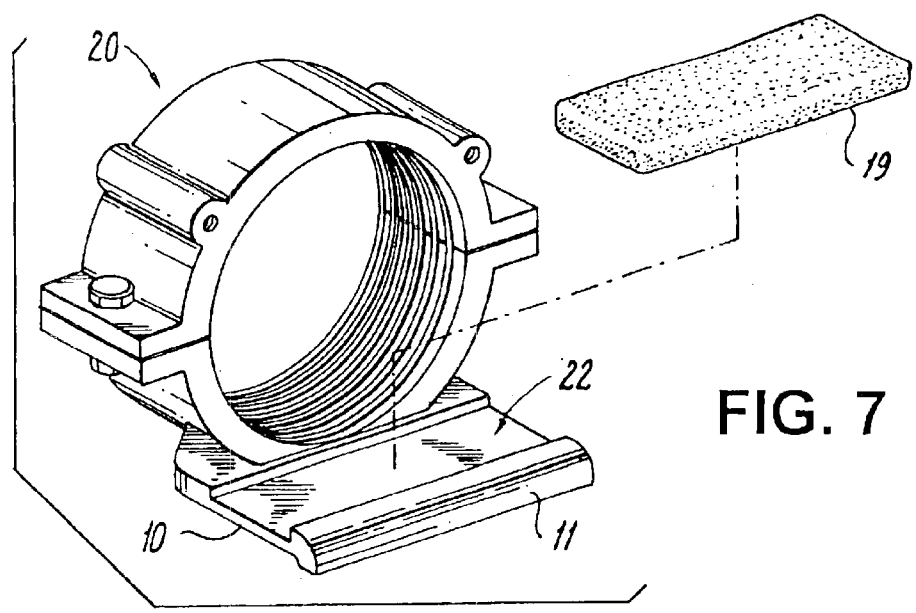
FIG. 7 is a perspective side view of the second embodiment of the present invention illustrating a trough in the lip portion of the damper body wherein fire rated putty is placed.
Figure 8:
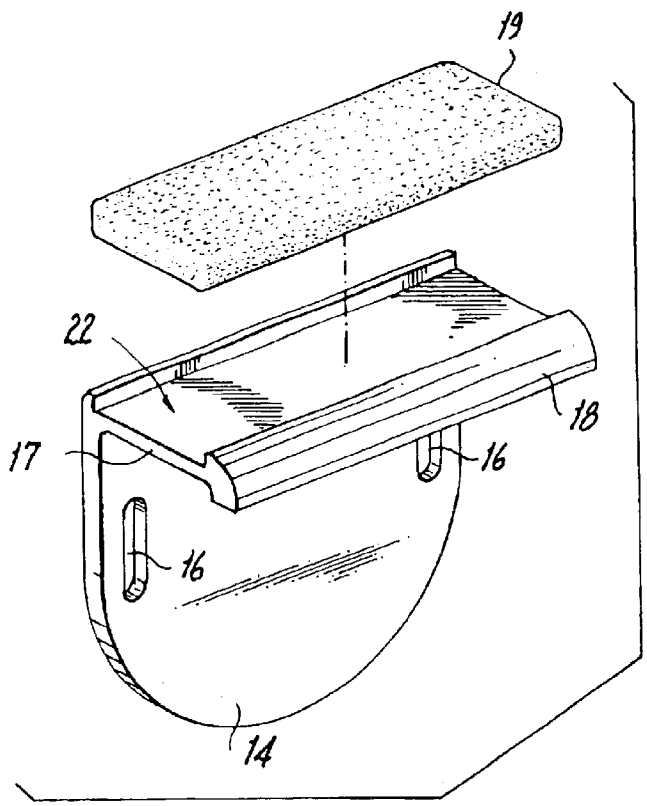
FIG. 8 is a perspective view of the second embodiment of the present invention illustrating a trough in the lip portion of the cover plate wherein fire rated putty is placed.

FIGS. 7 and 8 show a second preferred embodiment of the instant invention wherein a radially oriented trough portion 22 is situated in the lip portions of both the damper body 20 and the cover plate 14. The trough portions 22 extending the length of the lip portions whereby the fire rated putty 19 is held in place. The trough portions 22 having a nominal depth whereby the fire rated putty 19 is securely placed in the trough portions and the data lines are placed over the troughs. The use of the troughs prevents excessive putty build-up and preventing the putty from spreading beyond the lip portions when the lip portions are pressed together. The troughs provide a "clean" application of putty enabling the user to install the damper fitting without the putty entering into the sleeve when the lips are compressed.

Figure 9:
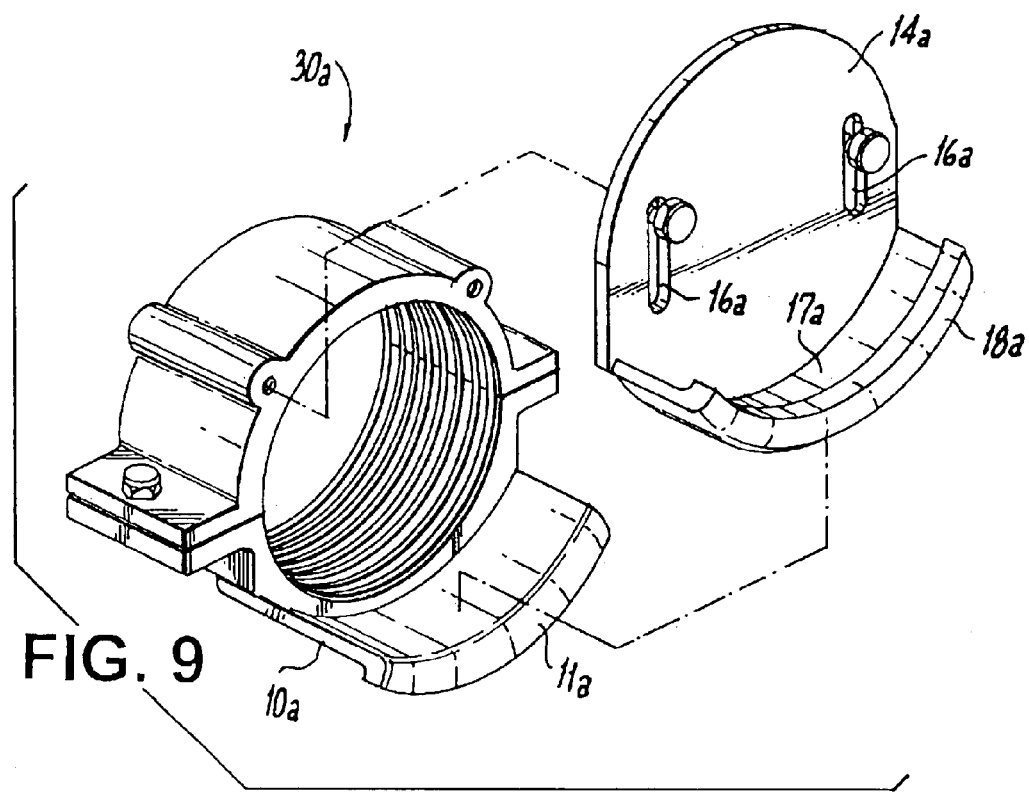
FIG. 9 is an exploded perspective view of the third embodiment of the present invention illustrating the lip portions of the damper body and the cover plate having a curvature.
Figure 10:
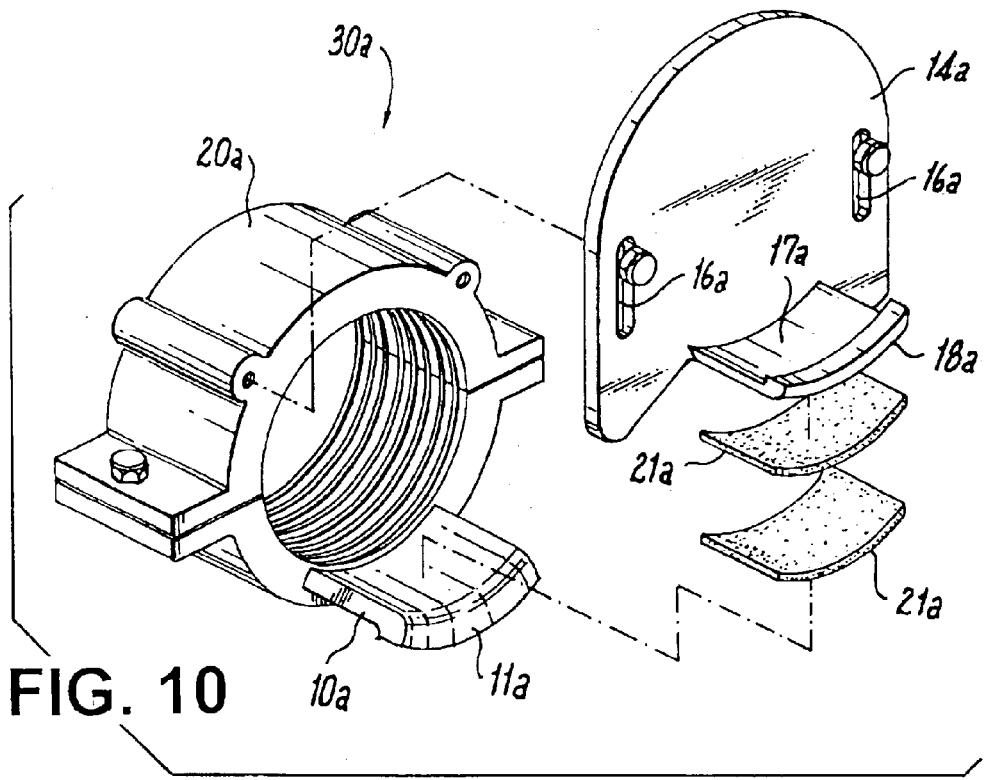
FIG. 10 is an exploded perspective view of the third embodiment of the present invention illustrating pads on the curved lip portions.

FIGS. 9 and 10 show a third embodiment of the damper fitting generally denoted by reference numeral 30a, whereby the lip portions 10a and 17a of the damper body 20a and the cover plate 14a, assume the curvature of the damper fitting. The lip portions of the damper body and the cover plate, due to their curvature, provide a cradling of the data lines 3a whereby the data lines do not separate from one another when extended through the fitting, thus preventing potential damage to the data lines. The data lines are prevented from separating, by the relative height difference between the side edges (not labeled) of the lip portions and the middle of the lip portion (not labeled), insuring the data lines remain on the body lip portion 10a. The curved lip portions having a downwardly curved edge portion 11a on the lip portion of the damper body 20a and an upwardly curved edge portion 18a on the lip portion 17a of the cover plate 14a. FIG. 10 shows pads 21a, corresponding to the shape of the curved lip portions 10a and 17a. The pads 21a of FIG. 10 are similar to the pads 21, as shown in FIGS. 5 and 6 with the exception that the pads 21a, of FIG. 10, assume the same curvature as that of the lip portions.

The instant invention as described above provides for a damper fitting which can be easily removed and retrofitted onto existing sleeves, thus negating the high cost of replacing sleeves and data transmission lines that are damaged due to trying to chip out a caulking compound intended to cover the entire opening of the sleeve. The configuration of the sliding cover plate, specifically in that the lip portions do not clamp together provide for a secure fire barrier without over compression of the data transmission lines which retard transmission flow.

As described above, the damper fitting of the instant invention provides a number of advantages, some of which have been described above and others, which are inherent in the instant invention. Modifications may be proposed to the damper fitting without departing from the teachings herein such as changing the shape and orientation of the damper fitting to fit different sized sleeves or to specifically suit a different shaped cross sectional sleeve such as square or oval shaped sleeves. A further proposed modification of the instant invention which is inherently contemplated in the embodiments above is that the lip portions of the body portion and the sliding cover plate can be modified to include axially oriented depressions which would cradle data transmission lines of similar or varying thicknesses. Further, the pads as described above can be configured to assume the same axial and radial depressions as contemplated above and further include corresponding trough portions as those shown in the second preferred embodiment. Accordingly, the scope of the invention is only to be limited as necessitated by the accompanying claims.

I claim:

1. A damper fitting, for placement on a sleeve containing data transmission lines in a fire rated barrier, to maintain the integrity of the barrier, comprising:

a ring-shaped damper body attachable to an end of the sleeve, the damper body having a protruding lip portion and a pair of set screw openings on a face portion of the damper body for accepting set screws; and a vertically sliding cover plate slidingly engageable with the face portion of the damper body having a protruding lip portion, the cover plate having vertical slots which enable the cover plate to slide along and be affixed to the damper body by the set screws.

2. The damper fitting as defined in claim 1, wherein the data transmission lines are threaded through the damper body from the sleeve and placed on the lip portion of the damper body, whereby a bead of fire-rated putty is placed along the length of the lip portion of the damper body and the cover plate is slidingly engaged so that the lip portion of the cover plate comes in contact with the bead of putty and the data transmission lines, the cover plate prevented from further sliding by tightening the set screws.

3. The damper fitting as defined in claim 1, wherein said ring-shaped damper is comprised of an upper portion and a lower portion, both portions having flanges and attached to the sleeve by means of clamping bolts.

4. The damper fitting as defined in claim 1, wherein said ring shaped damper body is provided with internal threads in order to mate with threads on the sleeve.

5. The damper fitting as defined in claim 1, wherein said ring shaped damper body is provided with at least one threaded opening which accommodates a body set screw in order to fixedly attach the damper body to the sleeve.

6. The damper fitting as defined in claim 1, wherein said protruding lip portion of the damper body has a downwardly curved edge portion and the protruding lip portion of the vertically sliding cover plate has an upwardly curved edge portion.

7. The damper fitting as defined in claim 1, wherein the protruding lip portions of the damper body and the cover plate are provided with pads.

8. The damper fitting as defined in claim 1, wherein the protruding lip portions of the damper body and the cover plate are provided with troughs.

9. The damper fitting as defined in claim 1, wherein the protruding lip portions of the damper body and the cover plate are curved.

10. The damper fitting as defined in claim 1, wherein the protruding lip portions of the damper body and the cover plate are flat.

* * * * *